United States Patent [19]

Hore

[11] 4,442,392

[45] Apr. 10, 1984

[54] ELECTRIC INDEXING DRIVE AND STEPPING MOTOR WITH DRIVE RETARDATION THEREFOR

[75] Inventor: Donald L. Hore, Bristol, England

[73] Assignee: Hornet Electrical Company Limited, England

[21] Appl. No.: 372,521

[22] Filed: Apr. 28, 1982

[30] Foreign Application Priority Data

May 1, 1981 [GB] United Kingdom ............... 8113602

[51] Int. Cl.³ ............................................. G05B 19/40
[52] U.S. Cl. ..................................... 318/696; 74/527; 310/49; 310/77; 318/448
[58] Field of Search ................. 74/527, 567, 568, 569, 74/813 C, 813 L, 817, 822; 200/38 B, 65, 66; 318/159, 160, 254, 475–477, 696; 310/41, 49; 192/2

[56] References Cited

U.S. PATENT DOCUMENTS

| | | | |
|---|---|---|---|
| 2,879,416 | 3/1959 | Blanz | 310/77 |
| 2,884,792 | 5/1959 | Nemeth | 74/111 |
| 3,486,098 | 12/1969 | Bullinger et al. | 310/77 |
| 3,541,418 | 11/1970 | Agin et al. | 318/696 |
| 3,663,827 | 5/1972 | Ford et al. | 307/41 |
| 3,736,487 | 5/1973 | Cook et al. | 318/696 |
| 3,934,216 | 1/1976 | Ward | 335/272 |
| 4,262,240 | 4/1981 | Arai | 318/696 |
| 4,280,084 | 7/1981 | Chiang | 318/696 |

FOREIGN PATENT DOCUMENTS

| | | |
|---|---|---|
| 477122 | 7/1967 | Switzerland . |
| 1485154 | 5/1974 | United Kingdom . |
| 1485304 | 9/1974 | United Kingdom . |

Primary Examiner—J. D. Miller
Assistant Examiner—D. L. Rebsch
Attorney, Agent, or Firm—Larson and Taylor

[57] ABSTRACT

To provide an indexed drive to a device such as a rotary switch having a detent mechanism, a three step-phase stepping motor is wound with only two of the phases (A, B) in its stator slots (S1–S24). Those slots (*) which would carry the third step-phase winding in a conventional machine are left empty. To index the drive from one detent position (I) to the next position (J), first the step-phase (A) and then the step-phase (B) are energized, to take the detent mechanism past its top dead center position (X). The drive then continues to the next position (J) under the detent force and its own inertia, while the step-phase (B) is kept energized to provide electrical retardation to prevent overshoot.

15 Claims, 10 Drawing Figures

ELECTRIC INDEXING DRIVE AND STEPPING MOTOR WITH DRIVE RETARDATION THEREFOR

BACKGROUND OF THE INVENTION

This invention relates to part-turn or multi-turn rotary drives which are indexed to specific angular positions by means of a detent mechanism, such as a spring-loaded roller and cam mechanism or its mechanical or magnetic equivalent, and to means for electrically driving such mechanisms. An example of such a drive is a rotary selector switch, which may typically have four, six, eight or twelve switch detent positions at 90°, 60°, 45°, or 30° indexing angles.

Where such devices are normally operated manually, the manual effort required is to overcome the detent spring force to move from one index position towards the next; as soon as the half-way position is passed, the detent spring is no longer in opposition, but applies torque to bring the drive to the next detent position.

However, if an electric motor is used to drive such a mechanism, the combination of the motor torque and inertia and the forward driving torque of the spring tends to cause overshooting of the next position, leading to unsatisfactory operation.

SUMMARY OF THE INVENTION

The present invention provides an electric stepping motor for driving an indexed rotary drive arrangement having a detent mechanism, by means of which index positions thereof are determined, the motor including electrical windings and control means for energizing the windings to cause the motor to index the drive arrangement from one index position towards an adjacent index position, overcoming the force of the detent mechanism, characterized in that the motor has means for applying electrical retardation to the drive arrangement, as it approaches the adjacent index position under the action of the detent mechanism.

In a preferred embodiment, a three step-phase motor is provided (with a number of poles appropriate to the number of index positions required) but windings are only provided (or at least are only energized) in two of the three step-phases. Accordingly, energization of the first two step-phases is used to overcome the detent force, but instead of the third step-phase being used to drive the motor to the next index position, this drive is provided by the mechanical detent mechanism and the inertia of the system. The continued energization of the second step-phase can then provide electrical retardation.

DESCRIPTION OF PREFERRED EMBODIMENTS

Figure 1:
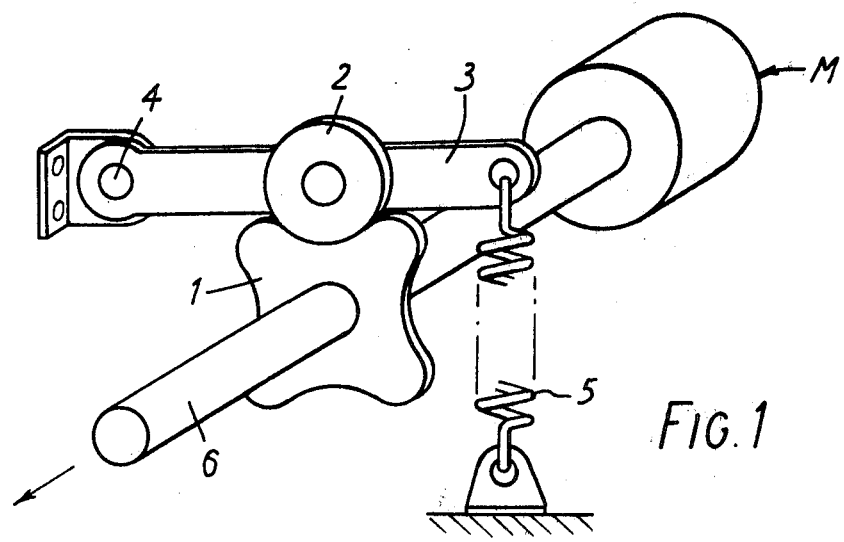
FIG. 1 is a diagrammatic illustration of an indexed rotary drive, with a mechanical detent mechanism.
Figure 2:
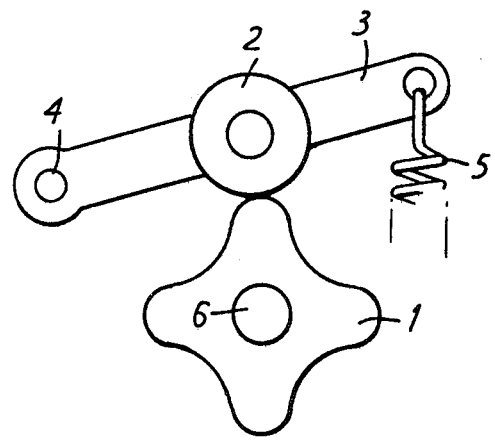
FIG. 2 is an end view of the drive in FIG. 1, in a different operative position.

FIG. 1 illustrates schematically a spring detented roller and cam mechanism for four 90° index positions, driven by a motor M. A four-lobed cam 1 is held in the detent position by roller 2 on lever 3 with pivot point 4. This lever is urged by spring 5 into engagement with the detent cam. The shaft 6 can only be turned from the detented position by forcing the roller away from the shaft against the spring force until, after 45° rotation, the roller is at the top of the cam (FIG. 2). Thereafter, the spring force applied to the roller against the cam profile develops a torque which will accelerate the cam and driven shaft until the roller reaches the bottom at the next detent position.

Figure 3:
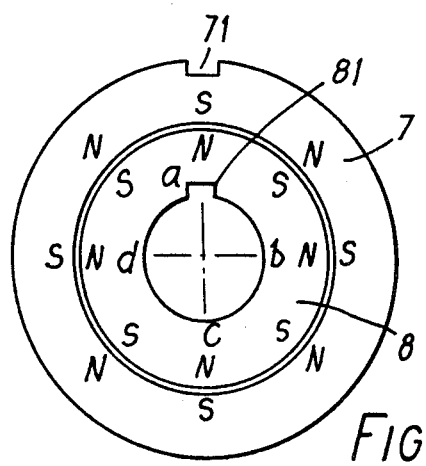
FIG. 3 is a diagrammatic end view of a magnetic detent mechanism.
Figure 4:
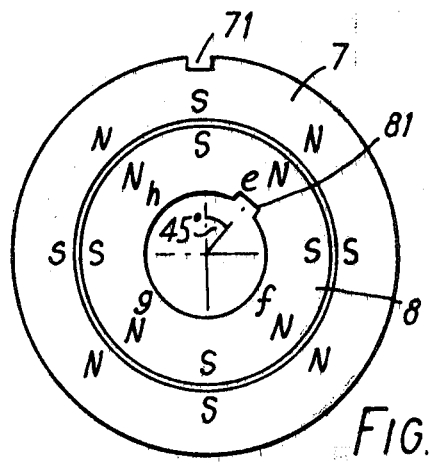
FIG. 4 shows the mechanism of FIG. 3 in a different operative position.

A magnetic mechanism of equivalent effect is illustrated schematically in FIGS. 3 and 4. An annular stator 7 of magnetic material is permanently magnetized with eight poles (north N and south S alternately) spaced around its inner surface. It is secured to a housing (not shown) and prevented from rotation, suitably by means of a keyway 71. Within the stator 7 is a rotor 8 also of magnetic material, and similarly magnetized with eight poles spaced around its outer surface. The rotor 8 has a keyway 81 so it can be secured for rotation with a motor-driven shaft similar to the shaft 6 driven by the motor M in FIG. 1.

FIG. 3 shows the rotor in one of four equilibrium positions (with the keyway 81 in the position marked a) when all the corresponding magnetic poles of the rotor and stator attract each other and hold the shaft in position. The other equilibrium positions, spaced 90° from each other, are with the keyway 81 in the positions b, c and d. Between these equilibrium positions, at 45° to them, there are four unbalanced, "top dead center" positions in which the poles of the rotor and stator repel each other. FIG. 4 illustates one of these positions, in which the keyway 81 is in a position e; the other unbalanced positions are when the keyway 81 is in positions f, g and h. Clearly, such an assembly provides a detent force urging the rotor to the nearest of the positions a, b, c and d in an equivalent manner to the cam and spring mechanism of FIGS. 1 and 2.

The detent mechanisms of FIGS. 1 to 4 are of course shown only by way of example, and the present invention is applicable to a very wide variety of such mechanisms. For simplicity, however, the following description will refer mainly to a spring detent mechanism. Furthermore, although FIGS. 1 to 4 refer to mechanisms with four detent positions spaced by 90°, they are of course easily adapted to other numbers of detent positions. For example, six detent positions spaced by 60° can be produced with a six-lobed cam 1, or with a twelve pole stator 7 and rotor 8.

In order to drive a device such as shown in FIGS. 1 to 4 electrically, the motor must provide a high torque in the appropiate direction for the 45° required to overcome the detent force. In doing so, it will have accelerated the load to a certain speed; continuation of the drive beyond the 45° point will cause greater acceleration because spring and motor torques are combined in the same direction. Because the motor rotor inevitably adds inertia to the system, the acceleration and inertia will almost certainly cause the next detent position to be overshot. It is therefore most desirable that the motor should be capable of changing from driving to braking mode at some point in the operating cycle, and should be disconnected at the appropriate position to allow the detent mechanism only to complete the positioning of the drive without significant overshoot.

The following description shows how to achieve this degree of control by selection of a stepping motor with the appropriate step angle, and number and angular displacement of energizing windings, in combination with a spring detent mechanism for a particular angle.

Figure 5:
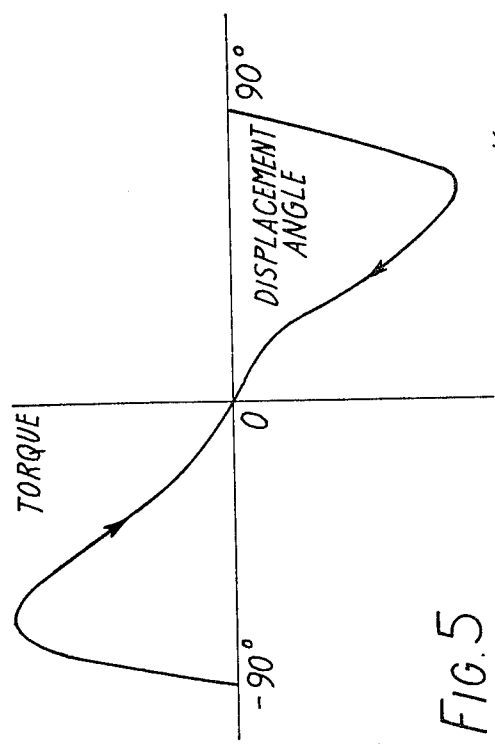
FIG. 5 shows the torque/displacement characteristic of a typical stepping motor.

FIG. 5 shows the torque/displacement characteristic of a typical stepping motor for one pair of poles. The stepping motor may be of any suitable type, but the a.c. machine described in U.K. Patent 1485154 is particularly suited to large step angles.

The center zero point on the horizontal axis represents the null position to which the stepping motor output is urged on energization of the particular pair of poles. Displacement of the rotor either way will cause an increased restoring torque until the unstable crossover position is appoached 90 electrical degrees from the null position, where the torque again goes through zero. Useful torques can therefore be developed up to less than 90 electrical degrees from the null position.

Figure 6:
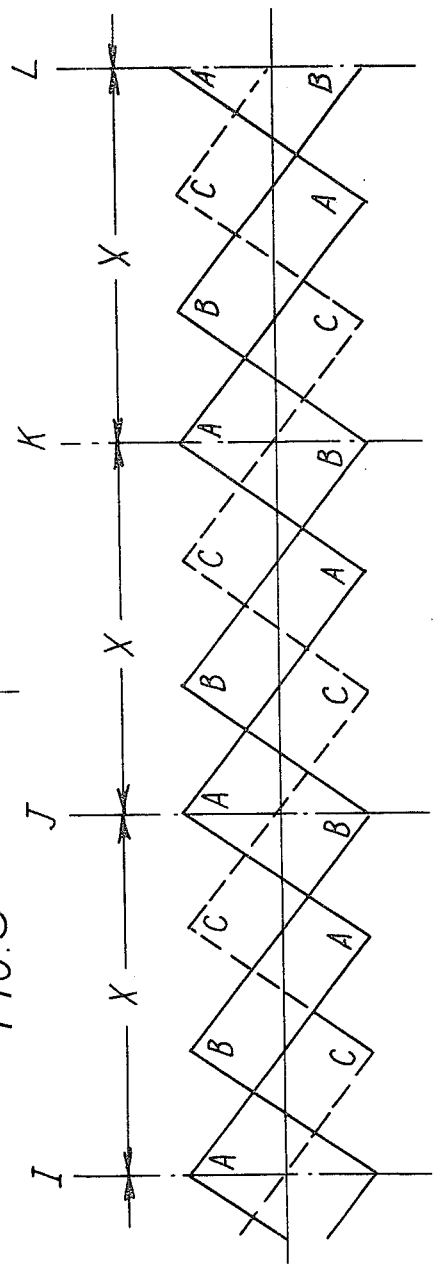
FIG. 6 is a graphical illustration of the principle of a preferred embodiment.

If the machine is of two pole construction, the degrees of mechanical displacement and electrical displacement correspond, i.e. 90 electrical degrees corresponds to a quarter-turn. For larger pole numbers, the mechanical displacement corresponds to the electrical displacement divided by the number of pairs of poles, i.e. 45° for four pole, 30° for six pole, 22½° for eight pole, and so on. To achieve the required effect, therefore, the orientation of the energizing windings, hereafter referred to as step phase windings, the motor output shaft and the mechanical detent positions in relation to each other should be such as to provide a high driving torque in the required direction at any detent position, and provide a retarding torque from the same or another step phase winding as the next detent position is approached. FIG. 6 shows diagrammatically a typical example. The positions I, J, K and L represent the four detent positions of a 90° indexing drive. The points marked "X" represent the top dead center positions of the detent mechanisms, while the arrows either side represent the direction of the spring force either side of these top dead center positions.

Below them are depicted the displacement torques of a four pole motor with three step-phases A, B and C, disposed at 60 electrical degrees, 30 mechanical degrees from each other. The torque characteristics are depicted as triangular for simplicity.

With the drive in position I it can be seen that engergizing step-phase A will produce a driving torque to the right, which will be referred to as the "Up" direction. As soon as the drive has moved 30°, the driving torque will fall to zero, but the detent spring torque is still opposing the motion, and tending to drive back to position I. Step-phase A alone will therefore not reach the mid-point X and the drive will stop short. If, however, having started movement with step-phase A, step-phase B is now switched on and A disconnected, a high torque will be available from B to drive past the top dead center position X, after which the spring torque will be assisting the up movement. At 60° movement, the null position for step-phase B is reached, after which the torque from B is in the reverse direction and opposing the detent spring. It will therefore retard the drive as detent position J is approached, and will stop it at a point at which the spring and motor torques are equal and opposite. If at this point the motor is switched off, the spring detent alone can position the drive with virtually no kinetic energy from the motor.

It will be clear that, from position J, a further movement in the Up direction can be started by energizing winding A again, but reverse motion Down can be started by energizing winding B. Again, it will be noticed that the torque from B falls to zero before the mid-point is reached, but that substituting winding A for B will continue the drive until A goes into reverse to oppose the spring before position I is reached. Switching off winding A will then permit the detent mechanism to restore the drive to position I.

It will now be apparent that, although the displacement of the windings is as for a three step-phase machine, only two of the windings are needed to achieve upward and downward movement and braking. Stepphase C is therefore superfluous, so that only the two windings and two switching means are required to achieve Up and Down control.

Figure 7:
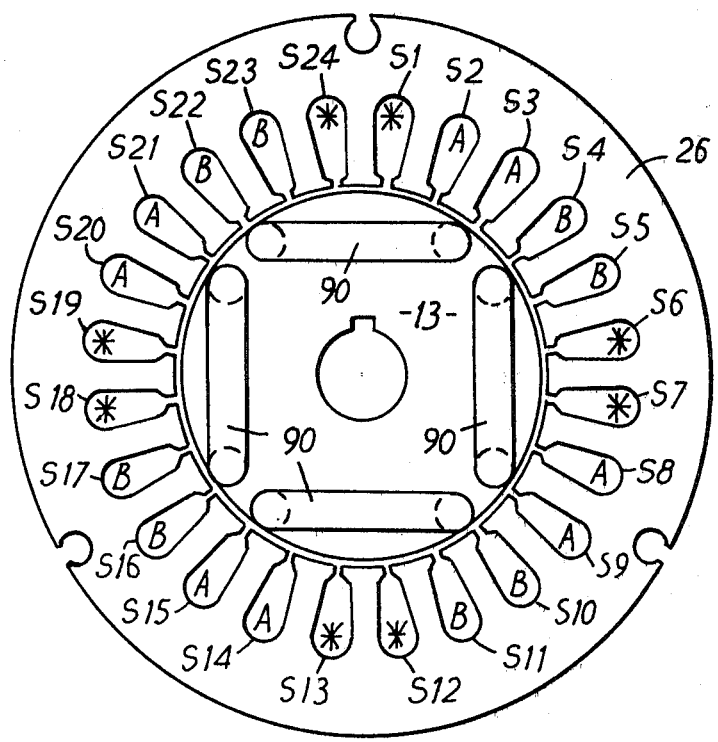
FIG. 7 is a diagrammatic plan view of a motor rotor and stator, showing a winding configuration.
Figure 8:
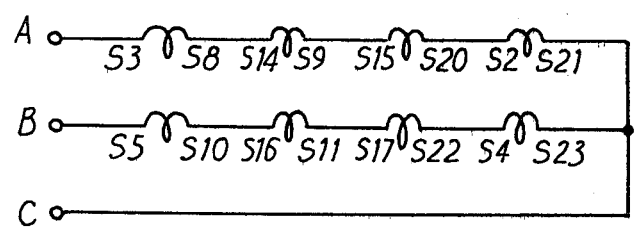
FIG. 8 is a wiring diagram corresponding to FIG. 7.

FIGS. 7 and 8 show details of how a four pole, three step-phase squirrel cage type a.c. stepping motor according to U.K. Pat. No. 1485154 is wound to give these results.

FIG. 7 depicts diagrammatically a rotor 13 and stator 26. The rotor has four short-circuit windings 90. The stator has twenty-four spaced slots numbered S1 to S24. In winding the motor, those slots marked with a star (*) are left empty. These correspond to the step-phase C of a conventional machine, which is not required in the present device. The letters A and B in the slots in FIG. 7 denote which of the remaining slots hold the windings of step-phases A and B respectively. These windings are shown in FIG. 8, in which the reference numbers S3, S8, etc indicate in which slots each winding is wound and the relative senses of the windings.

Thus, there is produced a four pole winding with two step-phases wound with the spacing of a three stepphase machine. Each step-phase comprises four coils of 6 slot pitch, connected in series.

While the illustration is of a 90° indexing drive, similar results can be achieved by the appropriate combinations of pole numbers with different detent angles. A six pole three step-phase machine with only two phases wound will suit a six-position 60° detent mechanism; an eight pole three step-phase machine with only two phases wound will suit an eight-position 45° detent mechanism, and so on.

In order to complete the indexing drive, switching means are required, with a suitably programmed controller which will switch the appropriate windings in sequence for a given up or down direction signal, and disconnect the second winding when the appropriate retardation has been applied. While this programming can be achieved by sensing the angular position of the motor shaft to change from the first to the second winding during the first half of the sequence and disconnecting the second winding at the appropriate point before the next detent is reached, it can also be done quite simply by timing, particularly with an a.c. stepping motor as described in U.K. Pat. No. 1485154. In this case the switching means can be bi-directional SCR's or Triacs, which will switch off at the end of each half cycle of a.c. power unless triggered again. It is therefore a simple matter for those versed in the art to design a pulse timing circuit which will apply the appropriate number of half cycles to the first winding to overcome the initial resistance of a detent mechanism, and then energize the second winding for a number of half cycles which can be adjusted to suit the particular detent mechanism. This invention therefore includes such a drive and its means for timing the switching of the two windings in response to a given direction signal, and timing the duration of the power pulse to apply the right amount of retardation to achieve fast positioning with insignificant overshoot. This is described below in relation to FIG. 6.

Figure 9:
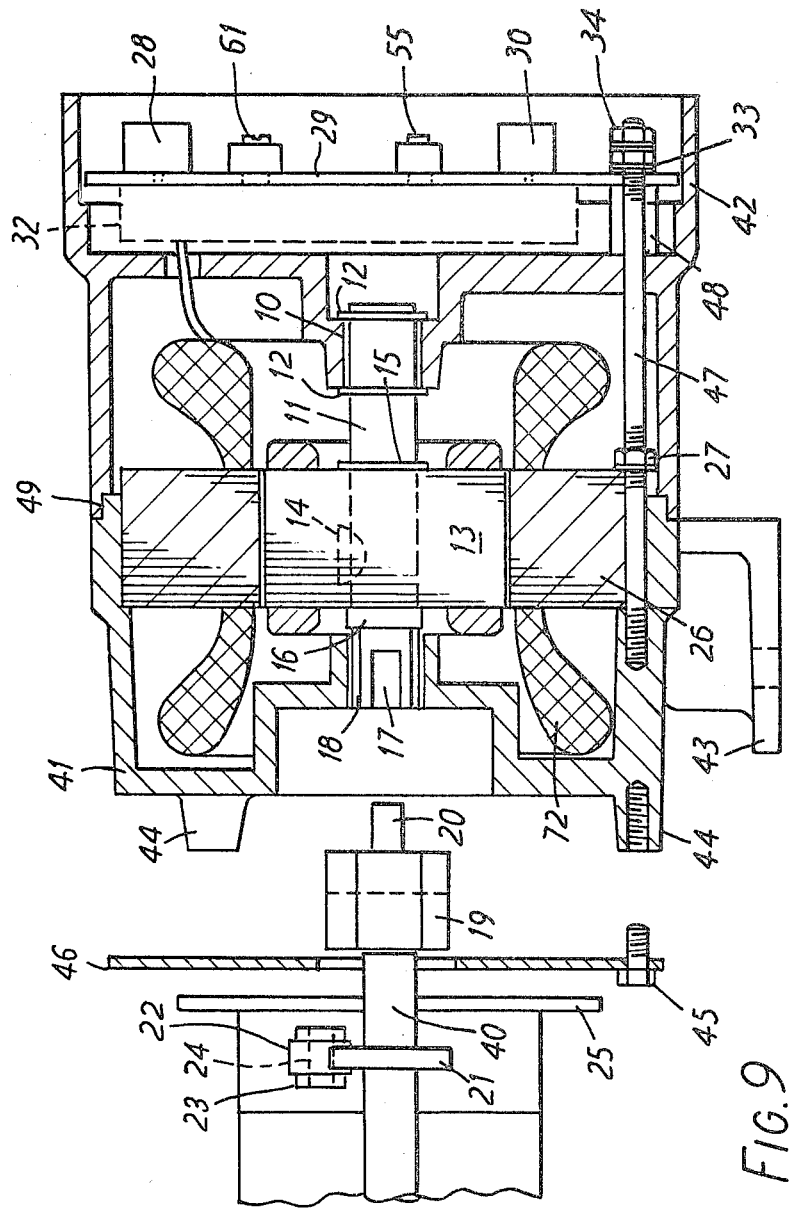
FIG. 9 is a cross-section through the preferred drive.

FIG. 9 shows an example of a drive which can be arranged as described above.

The motor is typically housed by two castings, 41 and 42. Housing 41 is the drive end, and carries a drilled mounting foot 43, and three cast bosses 44, spaced at 120° from each other and drilled and tapped to receive screws 45 by means of which mounting plate 46 is attached. Housing 42 is attached to housing 41 by means of three threaded studs 47, also spaced at 120° and clamped tight by spacing nuts 48, the circular castings being accurately aligned with each other by means of spigot register 49. Both housings incorporate bearings 10 to journal shaft 11, which is axially located by circlips 12 either side of the bearing in housing 42. Rotor 13 is secured in accurate alignment with the shaft by key 14 and in axial position by circlip 15 against shoulder 16. At its drive end shaft 11 has a machined slot 17, around which is pressed a bearing race 18. This device has the advantage of enabling a slot to be produced by a simple machining operation in the end of the shaft, while the bearing race not only provides a good surface for the bearing, but also prevents the slotted shaft from opening out as a result of applying driving torque to the coupling. Incorporation of the slot within the bearing minimizes the overall length of the machine plus coupling. The coupling typically comprises a hexagonal bar 19 from which is machined a protruding tongue 20 which fits in slot 17. Coupling 19 is machined at the other end to suit the drive shaft 40, which corresponds to the shaft 6 of FIG. 1. This may be typically of square section, requiring only a simple slot in the coupling. The square shaft 40 is urged into the appropriate step angles by the detent mechanism, which may typically comprise a cam 21 having the appropriate number of lobes and a roller 22 urged against the cam by spring loaded lever 23, shown here as double-sided, the roller being journalled on pivot pin 24 secured in the lever by any suitable means such as riveting. The spring loading mechanism is omitted from this illustration for simplicity. The mechanism may be of any appropriate type to produce the required detent step angles, as discussed above. Shaft 40 is continued through to the driven device requiring an indexed drive, such as a rotary switch. The detent, mechanism is attached to the mounting plate 46 by means of flange 25 and suitable nuts and bolts. When bolted in position, the bosses 44 on housing 41 provide sufficient space between mounting plate 46 and housing 41 for manual operation of coupling 19 by means of a spanner.

Stator 26, with windings 72, is held in position against a machined shoulder in housing 41 by means of nuts and washers 27 on studs 47. Connections to the stator winding are taken through a hole in housing 42 to suitable terminals 28 on printed circuit board 29. This also carries a second terminal block 30 for control wiring, adjustable potentiometer 61 for interval timing, and selector switch 55 for pulse timing. On the inner side of the circuit board are carried all other electronic components which do not require external access, within the area indicated by the broken line 32. The printed circuit board is clamped against spacing nuts 48 by nuts and washers 33; one of the studs may be extended to form a grounding stud by the addition of nuts and washers 34.

Figure 10:
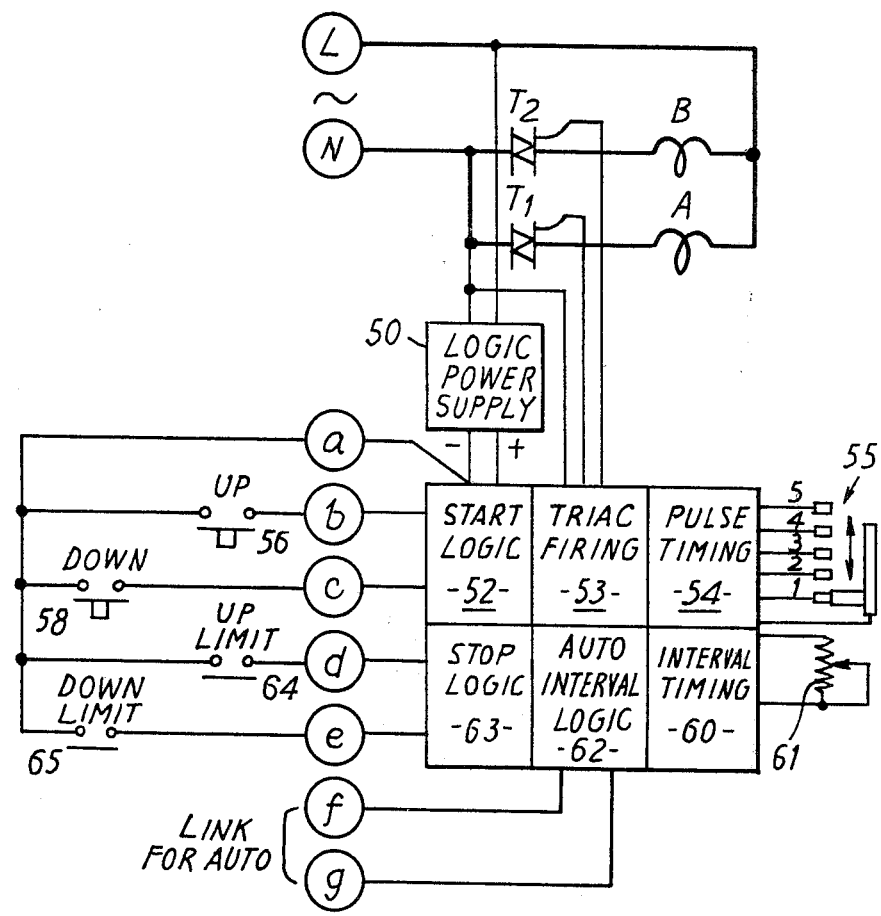
FIG. 10 is a block diagram of control circuitry for the preferred drive.

A block diagram of the control circuit is shown in FIG. 10. Windings A and B have their common points connected to the a.c. supply Line (L), while the other ends are connected to Neutral (N) via triacs or equivalent solid state switches T1 and T2. Line and Neutral are also connected to the logic power supply 50 to produce a low voltage d.c. output for the control circuit. The Start logic 52 is connected via terminals a, b and c to external Up and Down pushbuttons 56, 58, or equivalent remote control switches. The logic is interlocked so that only one signal is accepted in event of simultaneous operation of both remote controls; it is also latched to ensure that once a momentary start signal for the appropriate direction has been received, the complete operating cycle will be followed through. On receipt of an Up signal, the Triac Firing circuit 53 switches on triac T1 to energize winding A for a specific number of half cycles of a.c. mains. This is controlled by the Pulse Timing logic 54, following which winding B is energized and winding A de-energized. The duration of the power pulse through winding B is controlled by the Pulse Timing adjustment, which may typically take the; form of a slide switch 55, to enable a specific number of half-cycles to be set, to suit the particular detent mechanism used and the particular load. Once these half cycles have elapsed, the power is disconnected, and no further start signals accepted until a set time interval has elapsed. This is controlled by the Interval Timing logic 60, and the interval time is adjustable by means ofa.potentiometer 61.

On receipt of a Down signal at terminal c the Start logic will energize winding B via triac T2 for the fixed period, and then substitute winding A via triac T1 for the period determined by the Pulse Timing setting. So the drive can be indexed one step in either direction by the appropriate remote signal. If the signal is sustained, the Interval Timing logic locks the drive out of action until the signal is reset in the same or opposite direction.

However, there may be operating sequences in which it is required that the machine should automatically step onwards in the required direction with a sustained signal at an appropriate rate. This is provided for in the Auto Interval logic 62, which is connected to terminals f, g. If these terminals are linked, a sustained up or down signal will cause a further movement in the appropriate direction once the set interval time has elapsed. The stepping will continue for as long as the appropriate signal is sustained.

It may be necessary to limit the number of steps which may be taken in either direction, and for this purpose the Stop logic 63 is brought out to terminals d and e. Making a contact 64 between terminals a and d will prevent further stepping in the Up direction, while making a contact 65 between terminals a and e will prevent further rotation in the Down direction. The contacts 64, 65 may be limit switches or equivalent electronic sensors at the required limit positions.

By utilizing the appropriate step angle of detent mechanism and pole numbers of motor, the complete machine with its control circuit enables a drive to be indexed in either direction at the required step angle for a limited number of positions- it provides adjustment (Pulse Time) to enable the duration of the power pulse to be matched to the requirement of the detent mechanism and thus provide repeatably accurate positioning; the Interval. Time logic prevents excessively frequent operation which might lead to overheating, and its adjustment enables continuous onward stepping to take place at a required rate when the appropriate terminals are linked. Providing adjustment in this manner means that the motor and control circuit are adaptable to a very wide variety of detent mechanisms, and therefore may be fitted ih the field to an existing device such as a rotary switch having its own detent mechanism.

I claim:

1. In an electric stepping motor for driving an indexed rotary drive arrangement, said drive arrangement having a detent mechanism by means of which index positions thereof are determined, the motor including a drive shaft for driving said drive arrangement, electrical winding means arranged to apply torque to the drive shaft when energized, and control means for energizing the winding means to cause the motor to index the drive shaft and said drive arrangement from a first index position towards a second, adjacent index position against the force of the detent mechanism, said electrical winding means including a first electrical winding, said drive shaft having a null position in relation to said first winding in which said first winding applies no torque to said drive shaft when said first winding is energized, said null position being intermediate the first and second index positions, and said control means including means for energizing the first winding to drive the drive shaft to said null position in the direction from the first index position towards the second index position, and, said control means further including means for continuing energization of the first winding after the drive shaft has passed said null position so as to provide electrical retardation of the movement of said drive shaft as the drive shaft approaches said second index position under the action of the detent mechanism.

2. An electric stepping motor according to claim 1, wherein said electrical winding means comprises said first winding and a second winding, wound as two step-phases of a three step-phase configuration; and said control means to energize firstly said second winding and then said first winding, overcoming the detent force, and to continue energization of said first winding after the detent force has been overcome, so as to provide said electrical retardation.

3. An electric stepping motor according to claim 2, wherein said means to energize the windings comprises timing means to energize the first and second windings for respective predetermined periods.

4. An electric stepping motor according to claim 3 including means for adjusting the predetermined period for which the second winding is energized.

5. An electric stepping motor according to claim 2 including timing means for preventing re-energization of the first winding within a predetermined period after de-energization of the second winding.

6. An electric stepping motor according to claim 5 including means for adjusting the predetermined period for which re-energization of the first winding is prevented.

7. An electric stepping motor according to claim 5 including means for restarting said means to energize the windings automatically at the end of said predetermined period for which re-energization of the first winding is prevented.

8. An electric stepping motor according to claim 7 including limit switch means operatively mounted to switch over when the motor reaches a predetermined limit of travel, and electrically connected to the automatic restart means to inhibit said restarting when the motor has reached the limit of travel.

9. An electric stepping motor according to claim 2 wherein said means to energize the windings has two inputs; said means being responsive to a signal on one said input to energize firstly said second winding and secondly said first winding, overcoming the detent force; said means being responsive to a signal on the other said input to energize firstly said first winding and secondly said second winding, overcoming the detent force in a reverse direction; said means to energize the windings providing continuing energization of the secondly-energized winding so as to provide said electrical retardation.

10. An electric stepping motor according to claim 9 wherein said means to energize the windings comprises timing means to energize the firstly-energized winding and the secondly-energized winding for respective predetermined periods.

11. An electric stepping motor according to claim 10 including means for adjusting the predetermined period for which the secondly-energized winding is energized.

12. An indexed rotary drive arrangement comprising a drive shaft; a detent mechanism connected to the shaft for determining a plurality of rotationally spaced index positions of the shaft; and an electric stepping motor drivably connected to the shaft for driving the shaft from a first index position to a second, adjacent index position, the motor including electrical winding means for, when energized, applying torque to the drive shaft and control means for energizing the winding means to cause the motor to index the drive shaft from the first index position to the second index position against the force of the detent mechanism, said electrical winding means including a first electrical winding, said drive shaft having a null position in relation to said first winding in which said first winding applies no torque thereto when said first winding is energized, the null position being intermediate the first and second index positions, and said control means including means for energizing the first winding to drive the drive shaft to said null position in the direction from the first index position towards the second index position, and said control means further including means for continuing energization of the first winding after the drive shaft has passed said null position so as to provide electrical retardation of the movement of the drive shaft as the drive shaft approaches said second index position under the action of the detent mechanism.

13. An indexed rotary drive arrangement according to claim 12 wherein the detent mechanism is a spring-loaded mechanical detent mechanism.

14. An indexed rotary drive arrangement according to claim 12 wherein the detent mechanism comprises a rotor and a stator of magnetic material, the rotor and stator each being permanently magnetized with a corresponding plurality of magnetic poles which alternately attract and repel each other as the rotor rotates relative to the stator.

15. An indexed rotary drive arrangement according to claim 12, wherein said electrical winding means comprises said first winding and a second winding wound as two step-phases of a three step-phase configuration; and said control means includes means to energize firstly said second winding and then said first winding, overcoming the detent force, and to continue energization of said second first after the detent force has been overcome, so as to provide said electrical retardation.

* * * * *